Figure 1:
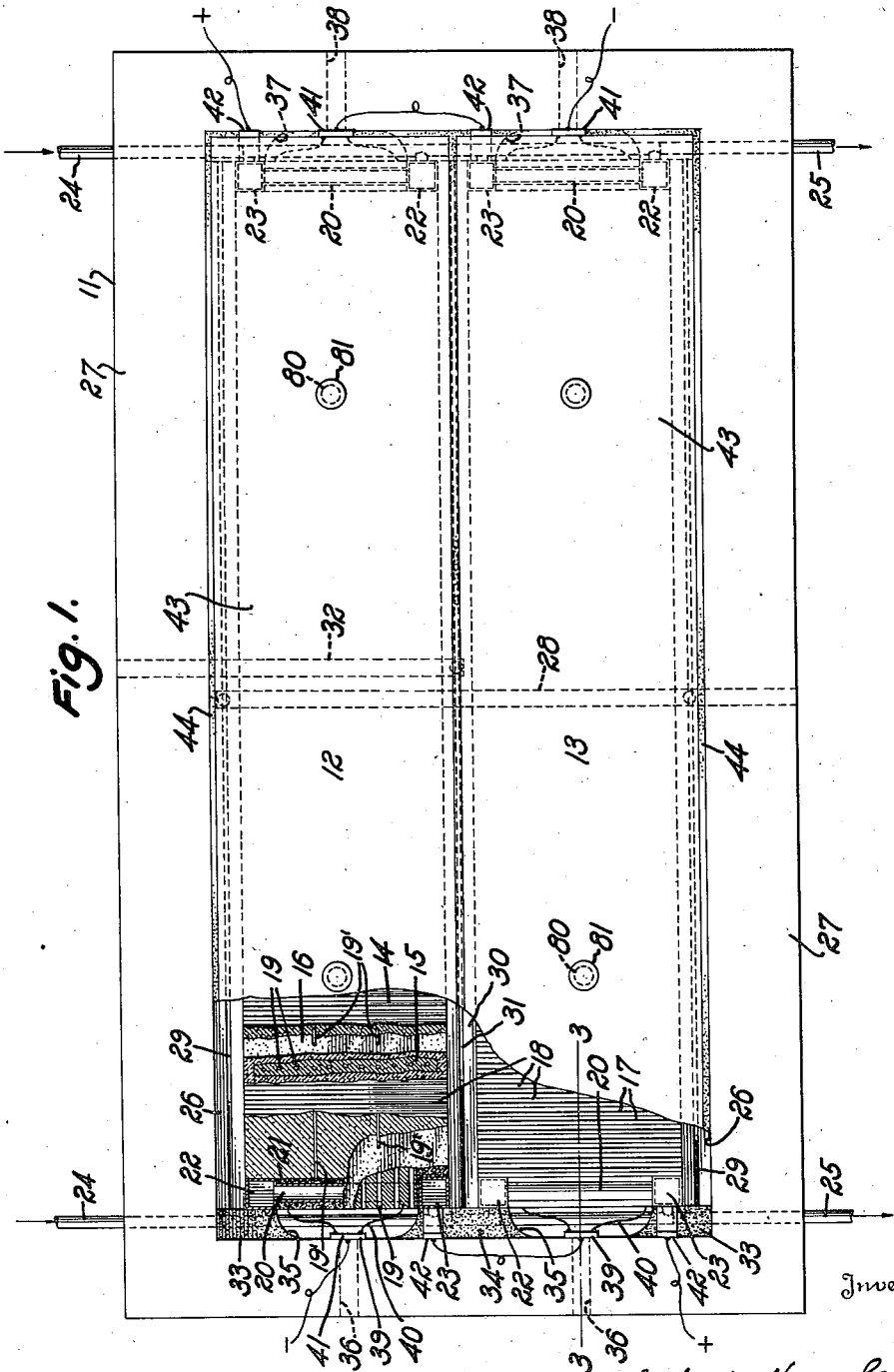

March 10, 1942.  H. H. GREGER  2,276,188
FUEL GAS BATTERY
Filed Oct. 9, 1939   5 Sheets-Sheet 1

Inventor:
Herbert Hans Greger
By Potter, Pierce & Scheffler
Attorneys.

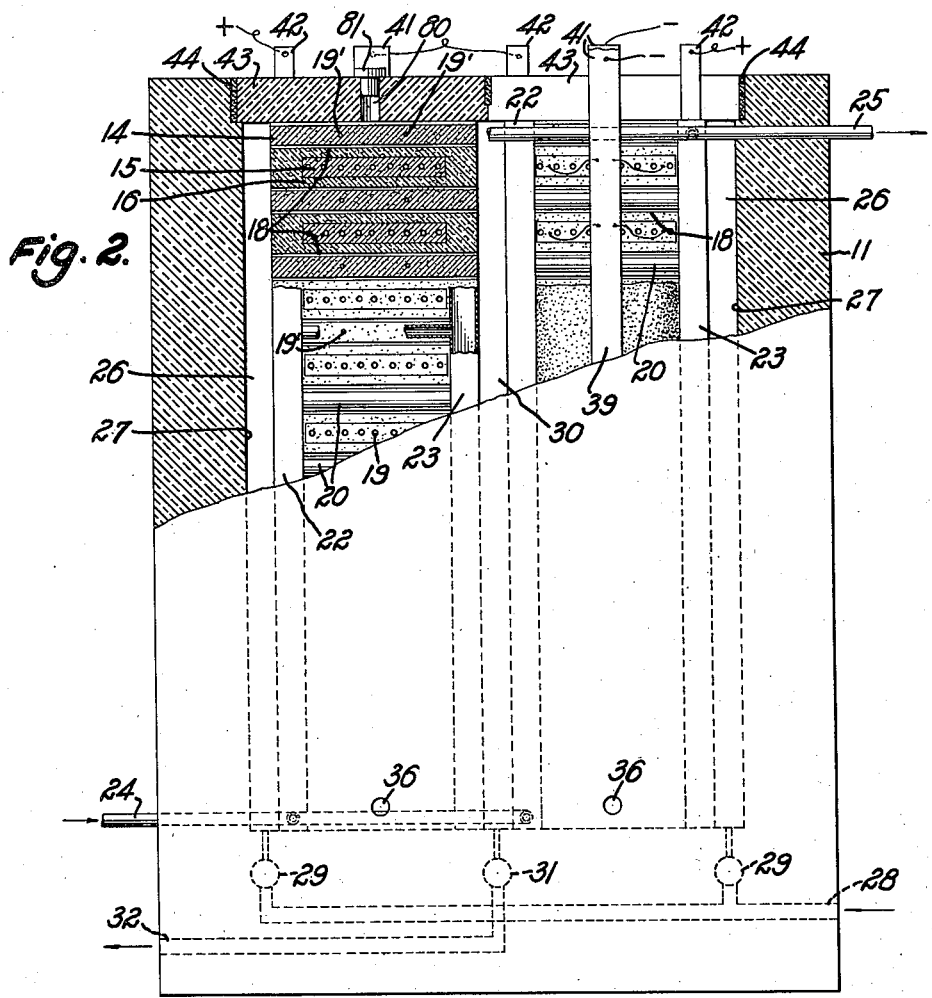

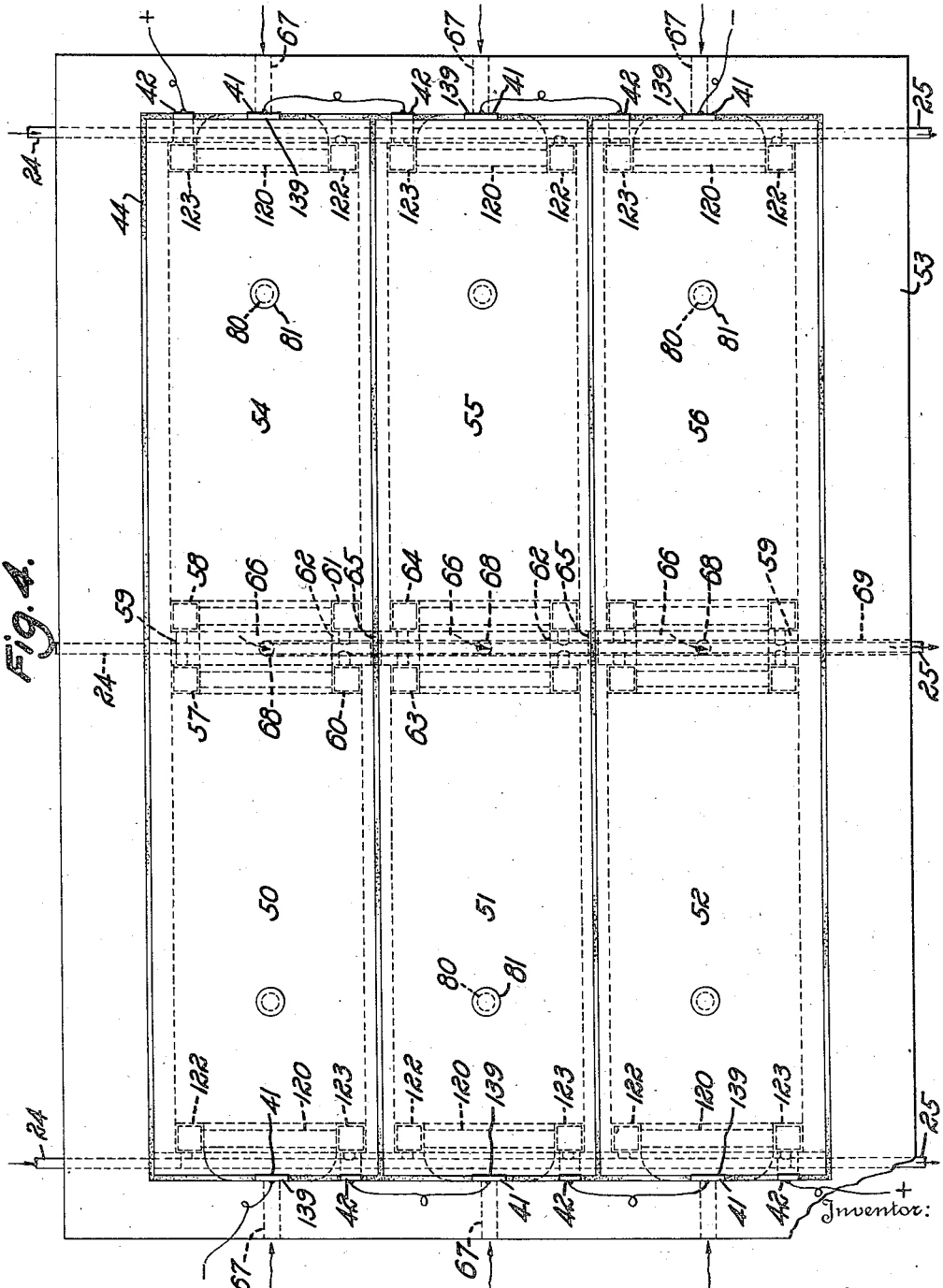

March 10, 1942.  H. H. GREGER  2,276,188
FUEL GAS BATTERY
Filed Oct. 9, 1939   5 Sheets-Sheet 4

Inventor:
Herbert Hans Greger
By Potter, Pierce & Scheffler
Attorneys.

March 10, 1942.          H. H. GREGER                2,276,188
                         FUEL GAS BATTERY
              Filed Oct. 9, 1939          5 Sheets-Sheet 5
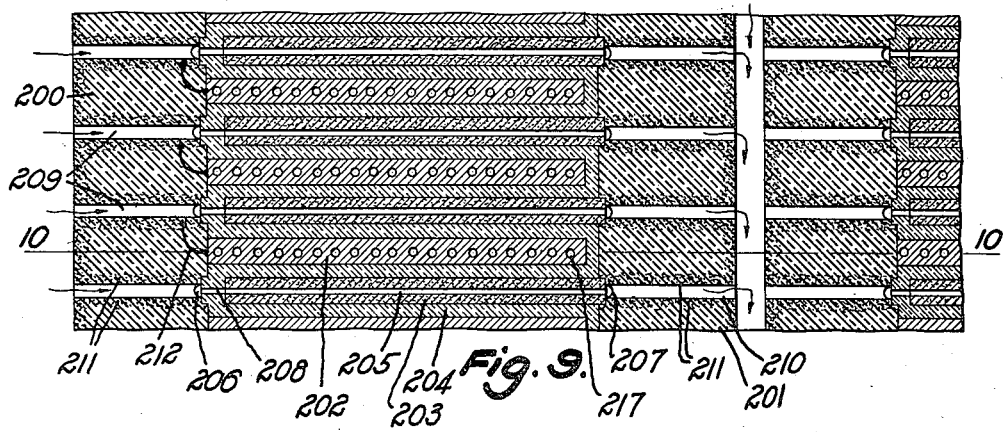
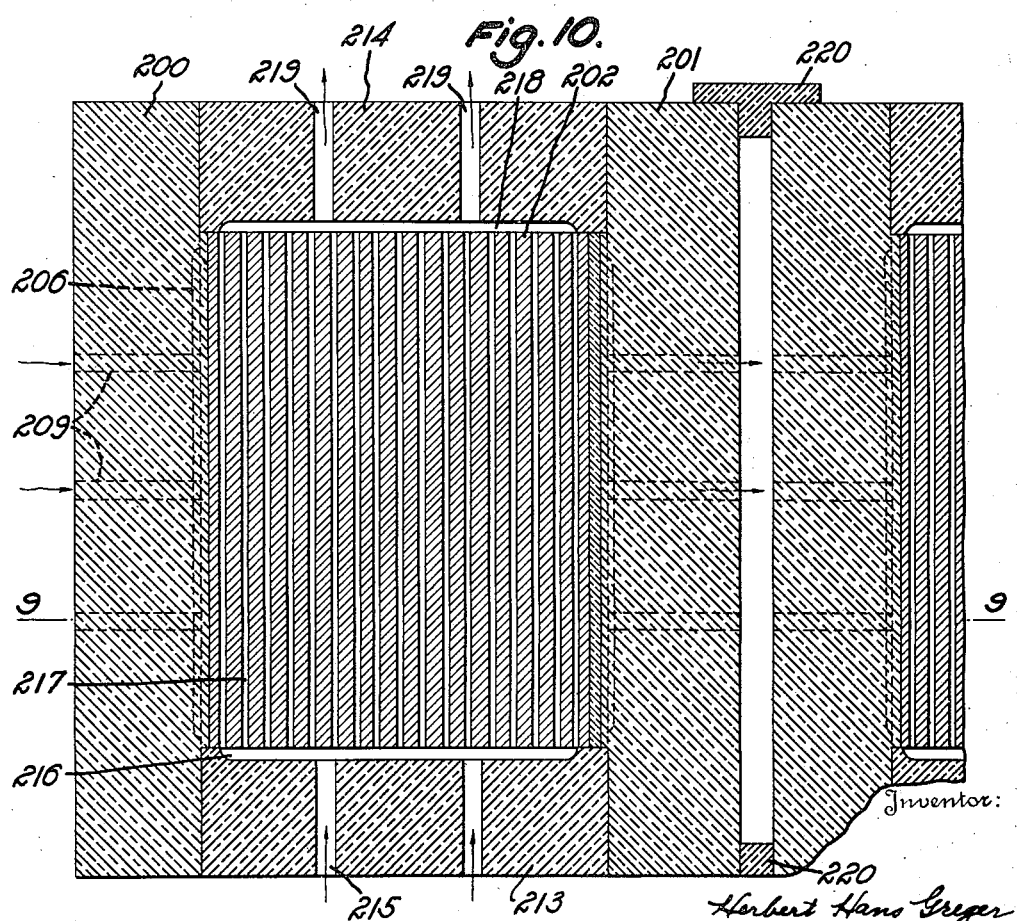

Patented Mar. 10, 1942

2,276,188

UNITED STATES PATENT OFFICE 2,276,188

FUEL GAS BATTERY

Herbert Hans Greger, Washington, D. C.

Application October 9, 1939, Serial No. 298,685

16 Claims. (Cl. 136—86)

This invention relates to the art of producing electrical energy by means of gaseous fuel combustion cells ("gas cells"); it is more particularly concerned with improvements in the structure of fuel cells and in the structure of batteries composed of pluralities of such cells.

It is an object of the invention to provide a fuel cell having an improved structure. Another object of the invention is the provision of an improved oxidizing electrode for a fuel cell. Still another object of the invention is the provision of an improved reducing electrode for a fuel cell. It is a further object of the invention to provide an improved process of making reducing electrodes for fuel cells. It is an object of the invention, also, to provide improved batteries or assemblages of fuel cells. Other objects of the invention will be apparent from a consideration of the ensuing general and specific descriptions.

A fuel cell of the type with which this invention is concerned essentially includes the following four elements: 1 a fuel electrode, to which the gaseous fuel is passed; 2 an oxidizing electrode, to which a gas containing free oxygen is passed; 3 a porous, refractory, electrically insulating diaphragm; and 4 a suitable electrolyte (e. g., a mixture of appropriate normally solid salts) contained in the pores of the diaphragm. Such cells are operated at a temperature at or above the fusing temperature of the electrolyte, e. g., in the temperature range between about 500° and about 750° C. Suitable electrolytes for such cells may consist largely of, or contain, carbonates of the alkali metals and/or the alkaline earth metals, having electrically conductive properties and being otherwise adapted to be employed in the environment of, and under the conditions prevailing in, the fuel combustion cell, alone or in admixture with other salts, such, for instance, as the halides of the alkali metals and/or the halides of the alkaline earth metals. The electrolytes disclosed in U. S. Reissue Patent No. 21,100 to Herbert Hans Greger, and falling within the scope of the above definition, are particularly suitable.

The diaphragm is a porous refractory insulator between the electrodes. It may be composed of alumina, magnesia, silica and various amounts of alkali metal compounds and alkaline earth metal compounds; minor amounts of fluorine and/or titanium may be present also. These substances need not be pure, and the following raw materials may be used: calcined bauxite, kyanite $(Al_2O_3.SiO_2)$, sillimannite, clay, kaolinite $(Al_2O_3.2SiO_2.2H_2O)$, calcined magnesite (MgO), silicate of soda, calcium aluminate or high alumina cement, sodium aluminate, talc, etc.

In contact with molten alkali metal carbonate and/or alkaline earth metal carbonates of the electrolyte the alumina and the silica of the above mentioned minerals are transformed into the corresponding aluminates, silicates and alumino-silicates. Analyses have shown that they are insoluble in the molten electrolyte.

It is of advantage to keep low the silica content of the diaphragm composition as the silicates that form largely determine the softening point of the diaphragm and its coefficient of expansion. The following formula is given as an example: 25% (by weight) of a mixture of 85% of fused alumina ground to a fine powder, and 15% refractory clay and 75% of finely powdered magnesite, calcined at 1100° to 1300° C. 100 parts by weight of this mixture are mixed with 20 parts of "C-Brand" silicate of soda diluted 1:1 with water. A moist, "sandy" mass thereby is produced which molds well under pressure. The content of silicate of soda largely determines the shrinkage and should be kept as low as molding operations may permit.

The diaphragm may be rigid, or, as will be explained more fully hereinafter, it may be formed from suitable powders tamped between rigid—preferably porous—electrodes.

The electrodes, which serve as stable conductors of electrical current, may be dense, or they may be porous. In both cases the electrochemical reactions are in principle the same: the reactions proceed at the juncture of the three phases electrode:electrolyte:gas. In the case of the porous electrode, the internal pore surfaces also may take part in the reaction: any gas which may penetrate the electrolyte is reacted on the pore surfaces of the electrode. Porosity providing large reacting surfaces in the pores is particularly desirable in a reducing electrode but can occur also in an oxidizing electrode. If the electrode be dense (i. e., substantially non-porous) it may with mechanical advantage be in the form of a corrugated sheet, or wire.

The E. M. F. obtained varies somewhat according to the type of electrode employed.

The composition of the oxidizing electrode may vary considerably and may consist of: copper oxide; iron oxides; nickel oxide; copper, zinc, magnesium or nickel ferrites; mixtures of two or more of such ferrites; or fused mixtures of copper, nickel, iron oxides and silver.

The reducing electrode may consist of: metallic copper or iron or nickel or silver; an alloy of two or more of such metals, iron-nickel-chromium alloys; or iron oxides.

Illustrative of the production of a porous electrode of sponge copper is the following: A powder of copper oxide is molded with the help of starch paste into a porous plate (or tube, or rod) with gas channels provided in the center plane thereof; these channels may be, for instance, holes $\frac{1}{16}$ inch in diameter spaced about $\frac{1}{8}$ inch apart. The molded material is dried at 100° C. and then fired at 950° to 1000° C. A content of NiO or FeO in the molding composition will make the sintering range of the shaped article less critical and improve its mechanical strength. If the resulting article is to be employed as a reducing electrode the copper oxide content of the same thereafter is reduced to metallic sponge copper by treatment with a reducing agent (e. g., with fuel gas), either before or after assembly in the cell: the temperature of reduction must be kept low, and the rate of reduction must be controlled, in order to prevent a violent reaction between the reducing agent and the oxide: however, where the reduction is caused to take place in the presence also of the electrolyte, the same proceeds slowly and smoothly and the setting up of objectionable stresses is minimized.

The copper oxide or sponge copper may also be placed on a suitable carrier, e. g., on a carrier formed of material of the same composition as the diaphragm. This measure of associating the active material of the electrode with carrier material not only may reduce the cost of the electrodes but also may prevent deformation of the soft sponge copper of the electrode under the pressure of overlying electrodes. For such purpose, a preformed shape formed from the refractory material may be impregnated with molten copper oxide, and, as desired, thereafter appropriately treated.

I have found that particularly advantageous results are to be obtained by adding from 1 to 10 percent of metallic silver to the copper oxide-containing molding (or "casting") composition from which the electrodes are to be formed. The metallic silver readily dissolves in the copper oxide. The resulting casting or molding is finely crystalline, very tough, and its surface has, or may be given, a fine smooth finish. Such addition of silver to the electrode composition tends to suppress evolution of gas from the melt, so that the resulting product is practically free from bubble holes.

Instead of casting dense electrodes, they may also be pressed from a suitable mixture of metal and metal oxide powders. The metal powder on oxidation grows and expands into the remaining pores of the pressed body, thus producing a dense electrode. Leads may be pressed into such an electrode during the molding process.

In constructing a cell, I may employ two like electrodes (i. e., two porous, or two dense, electrodes), or one porous and one dense electrode: in the latter event either the reducing or the oxidizing electrode may be the porous (or the dense) member. Moreover, I have found it possible to construct a cell using a monolithic combination of electrodes and diaphragm, in which combination the electrodes may both be porous or both be dense, or one may be dense and the other porous. In constructing such monolithic combinations I may, for example, select two dense electrodes having appropriately corrugated surfaces, and bond same to the opposite surfaces of the diaphragm in such fashion as to convert the corrugations into a multiplicity of fuel gas, and air, channels.

It should be emphasized, at this point in the description, that in general the gas streams do not physically mix but must remain separated at all times in their passage through the cell. The oxygen used up in the electrochemical reaction is carried by the anion through diffusion as part of the liquid electrolyte to the negative electrode where, by reaction with the fuel gas with the anion, the fuel gas is oxidized, resulting in a reduction of the anion and in the liberation of electric charges to the electrodes. The direct mixing of the gases does not result in the generation of electricity but rather of heat, and hence must be avoided. It is, therefore, obvious that the engineering design of a cell must take care of gas-tightness and of separation of the gas and air streams.

Instead of the combination above described, I may construct one electrode (e. g., the oxidizing electrode) in the form of a plate, bar, rod or the like, this electrode containing gas channels; mold or form the diaphragm material thereareound; and fabricate the other electrode about the resulting shape, as by winding a wire of suitable metal about the diaphragm, the windings being suitably spaced to define gas channels. In employing this form of construction in fabricating a battery of cells, every second unit may be so wire wound as to serve two adjacent units.

I prefer so to form the cell that the currents of fuel gas and of air "cross" each other in their separate passages through the cell. That is to say, the direction of flow of the air streams or stream through the cell is substantially perpendicular to the direction of flow of the fuel gas streams or stream through that cell This facilitates the separate serving of the air (and of the fuel gas) to an assemblage of cells. The planes of the respective currents are parallel and may be and preferably are both horizontal.

In constructing a battery from a plurality of such cells, the latter are assembled in such fashion that at least one electrode serves two adjacent cells. In certain battery assemblages in accordance with the present invention I may so fabricate the battery that each electrode which touches two diaphragms serves two adjacent cells. Thus, I may assemble a plurality of plate-type cells into a battery, in which between each of a pair of reducing electrodes there is positioned an oxidizing electrode, the alternate reducing and oxidizing electrodes being spaced apart by diaphragm material carrying electrolyte, the reducing electrodes being electrically connected to a suitable negative bus bar and the oxidizing electrodes being electrically connected to a suitable positive bus bar. In this structure a single cell is constituted by electrolyte-impregnated diaphragm material spacing apart an oxidizing and a reducing electrode the adjacent halves of which electrodes are in reactive contact with the electrolyte in said diaphragm. Each cell of each pair of adjacent cells, therefore, shares one electrode in common with the adjacent cell. In the battery assemblage just described the cells are connected in parallel to increase the amperage or current capacity.

A plurality of such battery assemblages may be connected in series to increase the operating voltage. In such case, I prefer to separate electrically each battery from the adjacent battery by means of a space containing gas (i. e., air or fuel gas), although the insulation of each battery may otherwise be provided.

Provision is made for serving each pair of adjacent cells with a current of air, and with a current of fuel gas, from an air manifold and from a fuel gas manifold. For each such serving manifold there is a corresponding discharge manifold for the separate withdrawal of the air, and of the fuel gas, from the cells after the same has traversed the cells. Preferably, I locate the fuel gas manifolds in the outer confining walls of the battery and connect to a fuel gas main by means of a conduit extending through one of said walls. The air inlet and outlet conduits are located in the base or bottom wall of the battery. Incoming air may be discharged from a main into a manifold co-extensive with the insulating air space between two adjacent batteries of cells, from which manifold the air may discharge into said space through a slot communicating between the manifold and said space. The further course of the air is as follows: it is passed through the cells in contact with the oxidizing electrodes and electrolyte, collects in an air space at the remote side of the cell battery, and is passed out of the second air space through a discharge manifold.

There is, or may be, seepage of molten electrolyte from the porous diaphragms of the cells. For meeting this loss of electrolyte available at the electrode surfaces, I may employ any suitable means for replacing or replenishing electrolyte. Thus, I may collect drained electrolyte at the base of the battery and return the molten electrolyte to the top of the battery for re-introduction of the electrolyte into the diaphragms of the upper cells by percolation.

Adjuncts to the battery are: means for introducing the air and the fuel gas into the battery under pressure (i. e., suitable blowing or pumping mechanism); and a heat exchange mechanism for extracting heat from the gases discharged from the battery and for imparting that heat, or a controllable amount of that heat, to the incoming air and/or fuel gas. Preferably, (but not necessarily) I employ also any suitable means for admixing $CO_2$ in predetermined and controlled amounts with the incoming air prior to contacting the air with the electrolyte.

The invention will now be described in greater particularity in the following detailed description taken with the accompanying drawings, in which—

Figure 5:
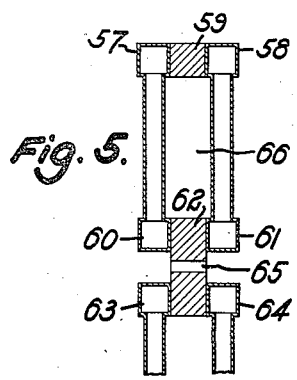
Figure 6:
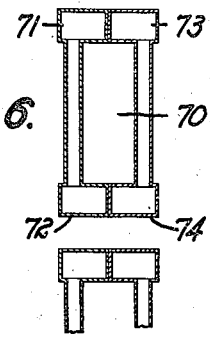
Figure 7:
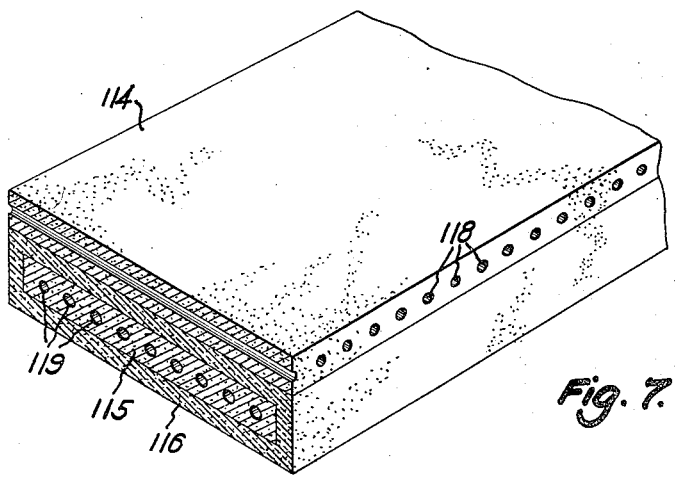
Figure 8:
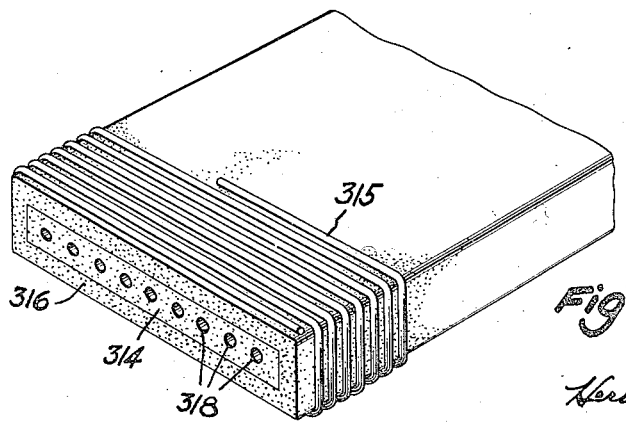

Fig. 1 is a top view of a battery illustrative of the invention, with parts in section, Fig. 2 is an end view thereof, partially in section, Fig. 3 is a fragmentary vertical sectional view taken on the line 3—3 of Fig. 1, Fig. 4 is a plan view of a modified battery construction embodying the invention, Fig. 5 is a horizontal sectional view through one of the manifolds employed in the battery of Fig. 4, Fig. 6 is a similar view through a modified form of manifold, Fig. 7 is a sectional perspective view, on an enlarged scale of a modified unit section of one of the cells, Fig. 8 is a perspective view illustrating the construction of another modified form of cell unit, Fig. 9 is a fragmentary vertical sectional view, on an enlarged scale, illustrating details of the assembly of battery units, and Fig. 10 is a horizontal sectional view on the line 10—10 of Fig. 9.

Referring now to the details of construction of the embodiments of the invention illustrated in the drawings and more particularly to Figs. 1, 2 and 3, the case or housing 11 of the fuel gas battery is in the form of an open topped receptacle and is preferably formed of suitable refractory material having both thermal and electrical insulating properties.

The battery illustrated in Figs. 1, 2 and 3 may be said to comprise two cell units, 12 and 13, of identical construction arranged alongside each other, each unit consisting of a stack or bank of oxidizing and reducing electrodes arranged in alternation, the oxidizing electrodes 14 being separated from the reducing electrodes 15 by the diaphragms 16.

Each of the oxidizing electrodes is formed as a rectangular slab or plate having ribbed upper and lower surfaces as indicated at 17, the ribs extending from side to side and forming a plurality of passages 18 with the plane surface of the adjacent diaphragm as will be readily understood. The reducing electrodes 15 are likewise in the form of flat rectangular slabs, being narrower in the transverse dimension than the electrodes 14 and are provided with a plurality of longitudinally extending passages 19 disposed about midway the upper and lower surfaces thereof.

While the diaphragms 16 could be formed as sheets, it is preferred to form the same in the nature of an envelope for the reducing electrodes and covering the top, bottom and longitudinal sides thereof so that the reducing electrodes and diaphragms may be handled as a unit.

As will be more clearly seen from Fig. 3, the oxidizing electrodes 14 are shorter than the reducing electrodes 15 and have longitudinally extending conducting wires 19' embedded therein which wires project from the ends of the units and are spot welded or otherwise connected to horizontal metal cross tubes 20 which serve as part of a combination bus and cooling unit. The space at the ends of the electrodes 14 around the tubes 20 may be filled with a suitable mortar 21.

The combined bus bar and cooling unit referred to above includes a pair of spaced vertically disposed tubular metal members 22 and 23 arranged at the ends of each stack of electrodes the tubular members of each pair being connected by the horizontal tubes 20 opening at their ends into the tubes 22 and 23. Cooling fluid introduced at 24 flows into the tubular members 22, thence through the cross tubes 20 and into the tubes 23 from which it is discharged at 25. It will be understood that the flow may be reversed or varied as desired. Cooling fluid (steam, or air) circulated through this combined bus bar and cooling unit serves to freeze electrolyte in the porous material contacting the bus bar.

Space is provided at the sides and ends as well as between the stacks 12 and 13. The spaces 26 between the outer longitudinal sides of the stack and the adjacent side walls 27 of the casing 11 constitute manifold spaces to which air or other oxygen bearing gas is supplied through inlet conduit 28 and distributing manifolds 29 disposed in the bottom of the casing. The space 30 between the stacks 12 and 13 constitutes a manifold space from which the air or other gas is withdrawn through collection manifold 31 and outlet 32 after passing through the channels 18 which establish communicating passages between the supply manifold spaces 26 and outlet manifold space 30.

The manifold spaces 26 are sealed off from the space at the ends of the casing by projecting wall portions or corner filling members 33 which may serve at the same time to position the stacks. The space 30 between the stacks is sealed from the end spaces by inwardly projecting wall portions or filling strips 34, the inner faces of which abut and extend between the adjacent tubes 23 and 22 of the adjacent stacks and also divide the end spaces into separate fuel gas manifolds for each stack.

Fuel gas enters the manifold spaces 35 at one end of the casing through fuel gas inlets 36 and passes through the fuel gas passages 19 in the reducing electrodes 15 to the manifold spaces 37 at the other end of the stack, being withdrawn through outlets 38.

The reducing or fuel electrodes are connected at opposite ends to suitable vertically arranged bus bars 39 as indicated at 40. The bus bars 39 and the tubular bus bar systems connected to the oxidizing electrodes are provided with terminals 41 and 42 respectively which extend above the top cover plates 43. The cover plates 43 are formed of material similar to that of the casing and have the joints sealed as at 44 with suitable sealing material so that the casing is gas tight.

The air manifold space 30 serves as an insulation space between the two stacks of cells and the air outlet channels 30—32 provide also for drainage of electrolyte. For this reason the conduit 32 should slant toward the outlet end thereof.

The form of the invention shown in Fig. 4 is employed when extra large and particularly long units are employed. In this modification the same type of electrodes and diaphragms chosen for the other forms may be used except that each stack is made up of units arranged end to end with intermediate gas manifold, bus bar units, etc. In Fig. 4, three stacks or banks of cells 50, 51 and 52 are arranged side by side at one end of casing 53, and three stacks 54, 55 and 56 are arranged at the other end in longitudinal alignment respectively with the stacks 50, 51 and 52, the adjacent ends of each longitudinally aligned pair of stacks being in spaced relation. Each stack of cells at the outer end thereof adjacent the end walls of the casing is provided with bus bars 122—120—123 and 139 and manifold connections as described in connection with the form shown in Fig. 1. The tubular bus bars connected to the oxidizing electrodes at the inner ends of the stacks, however, are in the form shown in Fig. 5 or Fig. 6. According to the form shown in Figs. 4 and 5, the space between adjacent outer upright tubular members 57 and 58 at the inner ends of the respective stacks 50 and 54 is closed by a suitable filler 59 extending the full height of the stack and the space between the respective connected upright tubes 60 and 61 is also filled by a filler 62. The filler 62 may also bridge across the space between the stacks 50—54 and stacks 51—55 to fill the space between upright tubular buses 63 and 64; in the latter case passages 65 are provided in the filler strip 62 to permit free flow of air in the air manifold space between the stacks. This construction produces a fuel gas manifold space 66 between the respective units of each pair and permits fuel gas to be fed into the end manifold spaces through inlets 67 at both ends of the casing, flowing from each end to the center through the gas passages in the fuel electrodes and discharging into the central manifolds 66 from which it is withdrawn through outlet connections 68 opening from said manifolds 66 in the bottom of the casing, the latter being connected to a discharge conduit 69.

The tubular bus construction shown in Fig. 6 provides the central gas manifold 70 without resort to filler strips by forming the upright tubular bus members 71, 73, and 72, 74 in oblong instead of square cross-section so that they abut one another.

Fig. 7 illustrates a modification of the invention wherein the porous oxidizing electrode 114 is formed with smooth top and bottom surfaces and with air passages 118 extending laterally therethrough. The fuel electrode 115 with enclosing diaphragm 116 and fuel gas passages 119 is the same as that of Fig. 1. This construction provides a monolithic cell unit, a plurality of which may be superposed on each other to form a bank for a battery.

Fig. 8 illustrates a further modification wherein the oxidizing electrode 314, provided with air passages 318, and enclosing diaphragm material 316 molded thereon to form a unit are provided with a wire winding 315, the turns of the winding being spaced to form gas channels when assembled in a stack with alternate fuel-electrode-diaphragm units from which the wire winding has been omitted. In such cell units, the wire winding constitutes the reducing electrode.

Suitable filling openings 80 closed by removable plugs or the like 81 are provided in the cover members for introduction of electrolyte.

In the form of the invention shown in Figs. 9 and 10, the side walls are constructed and the electrodes so arranged that each side wall constitutes bus means connecting electrodes of like polarity. The opposite side walls 200 and 201 are formed of suitable refractory material and the electrodes are mounted between them so that the oxidizing electrodes 202 at one end or side are in direct contact with the inner face of the side wall 200 and at the opposite end or edge are insulated from the wall 201 by diaphragm material. The reducing electrodes 203 are disposed with one end thereof in contact with the wall 201 and the other end thereof insulated from the wall 200 by diaphragm material.

In making up this battery, one electrode plate is placed in position and the diaphragm material 204 is spread over the top and around one end thereof to the desired thickness and tamped solidly in place, another electrode is then set in place on top of the layer of diaphragm material and additional diaphragm material is spread over the top and around the opposite end thereof, the operation being repeated until a battery of the desired size is built up. Thus a structure is produced in which a continuous layer of diaphragm material extends between and around opposite ends of adjacent electrodes.

The reducing electrodes are provided with gas passages 205 extending from edge to edge thereof and opening into manifold passages 206 and 207, respectively, in the inner faces of the walls 200 and 201, the diaphragm material around the ends of these electrodes being pierced at 208 in alignment with the passages 205. The walls 200 are provided with gas inlet passages 209, leading to the manifolds 206, and the wall 201 is provided with gas passages 210 leading from the manifolds 207.

The surfaces of the walls 200 and 201 in contact with the electrodes and in the area of the walls of the passages 209 and 210 are impregnated with a suitable reducible metal oxide, such as copper oxide, which is reduced to metallic copper, as indicated at 211, when a fuel gas is flowed through the battery so that the walls may serve as bus means connecting the respective sets of electrodes for the transmission of electricity produced thereby. It may be desirable to impregnate all of the wall surfaces in this manner, particularly when the walls are built up of bricks or blocks which may conveniently be individually impregnated before being assembed in the walls.

Since the reducing effect of the fuel gases does not extend to the area adjacent the ends of the oxidizing electrodes, the wall surfaces in the area thereof may be coated with metal as by spraying or in some other suitable manner, or leads as indicated at 212 may be provided between the same and the impregnated walls of the gas passages.

The end wall 213 is provided with air inlet passages 215 leading to manifolds 216 with which the gas passages 217 of the oxidizing electrodes communicate and the wall 214 is likewise provided with manifolds 218 and outlet passages 219 for withdrawal of the oxidizing gas.

As shown in Fig. 10, a number of batteries of this type may be arranged side by side with the space between suitably sealed as indicated at 220 for operation in series.

I claim:

1. A fuel cell unit, comprising a substantially rectangular oxidizing electrode formed to provide channels opening at opposite end faces thereof for passage of an oxidizing gas in contact with surfaces of said oxidizing electrode; a substantially rectangular reducing electrode formed to provide channels opening at opposite end faces thereof for passage of a fuel gas in contact with surfaces of said reducing electrode, said electrodes being disposed in juxtaposition and with the gas channels of one electrode extending from end to end of said unit and with the gas channels of the other electrode extending from side to side of said unit and in a direction transverse to that of the channels of the first said electrode; and an electrolyte-containing diaphragm separating said electrodes.

2. A fuel cell unit, comprising a substantially rectangular oxidizing electrode formed to provide channels opening at opposite end faces thereof for passage of an oxidizing gas in contact with surfaces of said oxidizing electrode; a substantially rectangular reducing electrode formed to provide channels opening at opposite end faces thereof for passage of a fuel gas in contact with surfaces of said reducing electrode, said electrodes being disposed in juxtaposition and with the gas channels of one electrode extending from end to end of said unit and with the gas channels of the other electrode extending from side to side of said unit and in a direction transverse to that of the channels of the first said electrode; an electrolyte - containing diaphragm separating said electrodes; and separate means for passing an oxidizing gas and for passing a fuel gas through the respective channels.

3. A fuel cell unit, comprising a substantially rectangular oxidizing electrode formed to provide channels opening at opposite end faces thereof for passage of an oxidizing gas in contact with surfaces of said oxidizing electrode; a substantially rectangular reducing electrode formed to provide channels opening at opposite end faces thereof for passage of a fuel gas in contact with surfaces of said reducing electrode, said electrodes being disposed in juxtaposition and with the gas channels of one electrode extending from end to end of said unit and with the gas channels of the other electrode extending from side to side of said unit and in a direction transverse to that of the channels of the first said electrode; and an electrolyte-containing diaphragm separating said electrodes, at least one of said electrodes being formed of a porous material in the mass of which are provided the channels for passage of gas.

4. The fuel cell unit defined in claim 1, in which the reducing electrode is so disposed as to provide the channels for passage of fuel gas in contact with a surface of said diaphragm.

5. A fuel cell comprising an oxidizing electrode, a reducing electrode, an electrolyte-containing diaphragm separating the electrodes, said electrodes being formed to provide separate channels for the passage of an oxidizing gas in contact with surfaces of said oxidizing electrode and for the passage of a fuel gas in contact with surfaces of said reducing electrode, a hollow bus bar member in contact with one of said electrodes, and means for circulating a cooling fluid through said hollow member.

6. A battery of fuel cells comprising a plurality of odixizing electrodes and a plurality of reducing electrodes arranged in alternate layers, electrolyte-containing diaphragm material layers separating said electrodes, said electrodes being formed to provide separate sets of channels for the passage of an oxidizing gas through said battery in contact with said oxidizing electrodes and for the passage of a fuel gas through said battery in contact with said reducing electrodes, each set of gas channels extending across said battery from one side to the opposite side thereof and in a direction transverse to that of an adjacent set of gas channels, and separate means at adjacent sides of said battery of fuel cells for passing an oxidizing gas and for passing a fuel gas through the respective channels.

7. A battery of fuel cells comprising a plurality of oxidizing electrodes and a plurality of reducing electrodes, arranged in alternate layers, electrolyte-containing diaphragm material layers separating said electrodes, said electrodes being formed to provide separate sets of channels for the passage of an oxidizing gas through said battery in contact with said oxidizing electrodes and for the passage of a fuel gas through said battery in contact with said reducing electrodes, and a combined cooling unit and bus bar member for said battery comprising a pair of spaced tubular metallic conduits, and a plurality of hollow cross members connecting said tubular conduits.

8. A battery of fuel cells comprising a plurality of oxidizing electrodes and a plurality of reducing electrodes, arranged in alternate layers, electrolyte-containing diaphragm material layers separating said electrodes, said electrodes being formed to provide separate sets of channels for the passage of an oxidizing gas through said battery in contact with said oxidizing electrodes and for the passage of a fuel gas through said battery in contact with said reducing electrodes, and a combined cooling unit and bus bar member for said battery comprising a pair of upright spaced tubular metallic conduits at one end of the battery, and a plurality of hollow cross members connecting said tubular conduits, each cross member being in the plane of an oxidizing electrode and spaced from the latter by a layer of electrolyte-saturated diaphragm material.

9. In a battery of fuel cells, a casing having bottom, side and end walls; a bank of fuel cells comprising alternate plate-type oxidizing electrodes and plate-type reducing electrodes separated from each other by layers of electrolyte-containing diaphragm material, said electrodes being formed to provide separate sets of channels for the passage of an oxidizing gas through said bank in contact with said oxidizing electrodes and for the passage of a fuel gas through said bank in contact with said reducing electrodes, said bank of fuel cells being positioned in said casing in spaced relation with respect to the side and end walls of the latter to define insulating manifold spaces at the sides and ends of said bank, the end manifold spaces being in communication with one set of channels and the side manifold spaces being in communication with the other set of channels, means adjacent the corners of the bank for sealing off the manifold spaces at the sides and ends from each other; means for introducing an oxidizing gas into one of the manifold spaces in communication with the oxidizing gas channels; means for withdrawing oxidizing gas from the opposite manifold space; means for introducing a fuel gas into one of the manifold spaces in communication with the reducing gas channels; means for withdrawing fuel gas from the opposite manifold space; an electrical conductor connected to said oxidizing electrodes; an electrical conductor connected to said reducing electrodes; and a sealing cover for said casing.

10. In a battery of fuel cells, a casing having bottom, side and end walls; in said casing, a plurality of banks of fuel cells, each bank comprising alternate plate-type oxidizing electrodes and plate-type reducing electrodes separated from each other by layers of electrolyte-containing diaphragm material, said electrodes being formed to provide separate sets of channels for the passage of an oxidizing gas through said bank in contact with said oxidizing electrodes and for the passage of a fuel gas through said bank in contact with said reducing electrodes, said banks being so positioned in said casing as to define insulating manifold spaces at the sides and ends of the banks, the end manifold spaces being in communication with one set of channels and the side manifold spaces being in communication with the other set of channels; means adjacent the corners of each bank for sealing off the manifold spaces at the sides and ends thereof from each other; means for introducing oxidizing gas into one of the oxidizing gas manifold spaces; means for withdrawing oxidizing gas from another of the oxidizing gas manifold spaces; means for introducing fuel gas into one of the reducing gas manifold spaces; means for withdrawing reducing gas from another of the reducing gas manifold spaces; an electrical conductor connected to the oxidizing electrodes of each bank; an electrical conductor connected to the reducing electrodes of each bank; and a sealing cover for said casing.

11. In a battery of fuel cells, a casing having bottom, side and end walls; in said casing, two banks of fuel cells each bank comprising alternate plate-type oxidizing electrodes and plate-type reducing electrodes separated from each other by layers of electrolyte-containing diaphragm material, said electrodes being formed to provide channels for the passage of an oxidizing gas laterally through said bank and in contact with said oxidizing electrodes and for the passage of a fuel gas longitudinally through said bank and in contact with said reducing electrodes, said banks being so positioned in said casing as to define insulating spaces at the sides of the banks and insulating spaces at the ends of said banks; means adjacent each corner of each bank for sealing off the spaces at the sides and ends thereof from each other whereby to form manifolds, the side and intermediate manifolds being in communication with the oxidizing gas channels through said banks and the end manifolds being in communication with the reducing gas channels through the banks; means for introducing oxidizing gas into at least one of said side and intermediate manifolds; means for withdrawing oxidizing gas from another of said manifolds; means for introducing fuel gas into the manifolds at one end of the banks; means for withdrawing fuel gas from the opposite manifolds; separate electrical conductors in operative contact with the oxidizing electrodes and with the reducing electrodes of each bank; and a sealing cover for said casing.

12. A fuel cell comprising an oxidizing electrode consisting essentially of a conductive material of the group consisting of copper oxide, iron oxide, nickel oxide, a copper ferrite, a zinc ferrite, a magnesium ferrite, a nickel ferrite, and silver, a reducing electrode, an electrolyte-containing diaphragm separating the electrodes, said electrodes being formed to provide separate channels for the passage of an oxidizing gas in contact with surfaces of said oxidizing electrode and for the passage of a fuel gas in contact with surfaces of said reducing electrode, said separate channels extending transversely with respect to each other and separate means for passing an oxidizing gas and for passing a fuel gas through the respective channels.

13. A fuel cell unit, comprising a substantially rectangular oxidizing electrode formed to provide channels opening at opposite end faces thereof for passage of an oxidizing gas in contact with surfaces of said oxidizing electrode; a substantially rectangular reducing electrode consisting essentially of a conductive material of the group consisting of copper, iron, nickel, silver, an alloy of at least two of the metals copper, iron, nickel and silver, an iron-nickel-chromium alloy, and an oxide of iron, formed to provide channels opening at opposite end faces thereof for passage of a fuel gas in contact with surfaces of said reducing electrode, said electrodes being disposed in juxtaposition and with the gas channels of one electrode extending from end to end of said unit and with the gas channels of the other electrode extending from side to side of said unit and in a direction transverse to that of the channels of the first said electrode, and an electrolyte-containing diaphragm separating said electrodes.

14. A fuel cell comprising an oxidizing electrode, a reducing electrode, one of said electrodes being a rigid porous plate-like member the composition of which consists essentially of copper oxide particles fritted together, an electrolyte-containing diaphragm separating the electrodes, said electrodes being formed to provide separate channels for the passage of an oxidizing gas in contact with surfaces of said oxidizing electrode and for the passage of a fuel gas in contact with surfaces of said reducing electrode, said separate channels extending transversely with respect to each other and separate means for passing an oxidizing gas and for passing a fuel gas through the respective channels.

15. A monolithic plate-type fuel cell unit adapted to be stacked upon a like cell unit in constructing a fuel cell battery, said cell unit comprising an inner, rigid, plate-like electrode, an envelope of porous electrolyte-impregnated diaphragm material surrounding said inner electrode save for two opposite ends thereof, and an outer, rigid, plate-like electrode substantially parallel to said inner electrode and being spaced from the latter by said diaphragm material envelope and being bonded to the latter to form a rigid, monolithic unit, the inner electrode being provided with gas channels in the mass thereof extending from one uncovered end to the other, and the outer electrode being provided with gas channels in the mass thereof extending through the latter.

16. In a fuel cell battery of the class described, a battery casing having side walls of refractory material, a plurality of oxidizing electrodes each having one end thereof in contact with one of said side walls and the other end thereof insulated from the other side wall, a plurality of reducing electrodes each having one end thereof in contact with said other side wall and the other end thereof insulated from said first mentioned side wall, said oxidizing and reducing electrodes being arranged alternately in superposed relation, a blanket of porous diaphragm material extending between adjacent electrodes and around the opposite ends of alternate electrodes, said electrodes having gas passages therein and said side walls and adjacent portions of said diaphragm blanket having gas passages therein for the flow of gas to and from said electrode gas passages, said side walls having electrode-contacting portions thereof and the walls of the gas passages therein impregnated with a reducible metal oxide whereby upon flow of a reducing gas through said passages the contacted metal oxide is reduced to conductive metal for transmission of electrical current from the electrodes.

HERBERT HANS GREGER.